Feb. 28, 1956
J. N. KALKANIS
2,736,355
HAM HOLDER FOR SLICING HAM
Filed Aug. 24, 1954
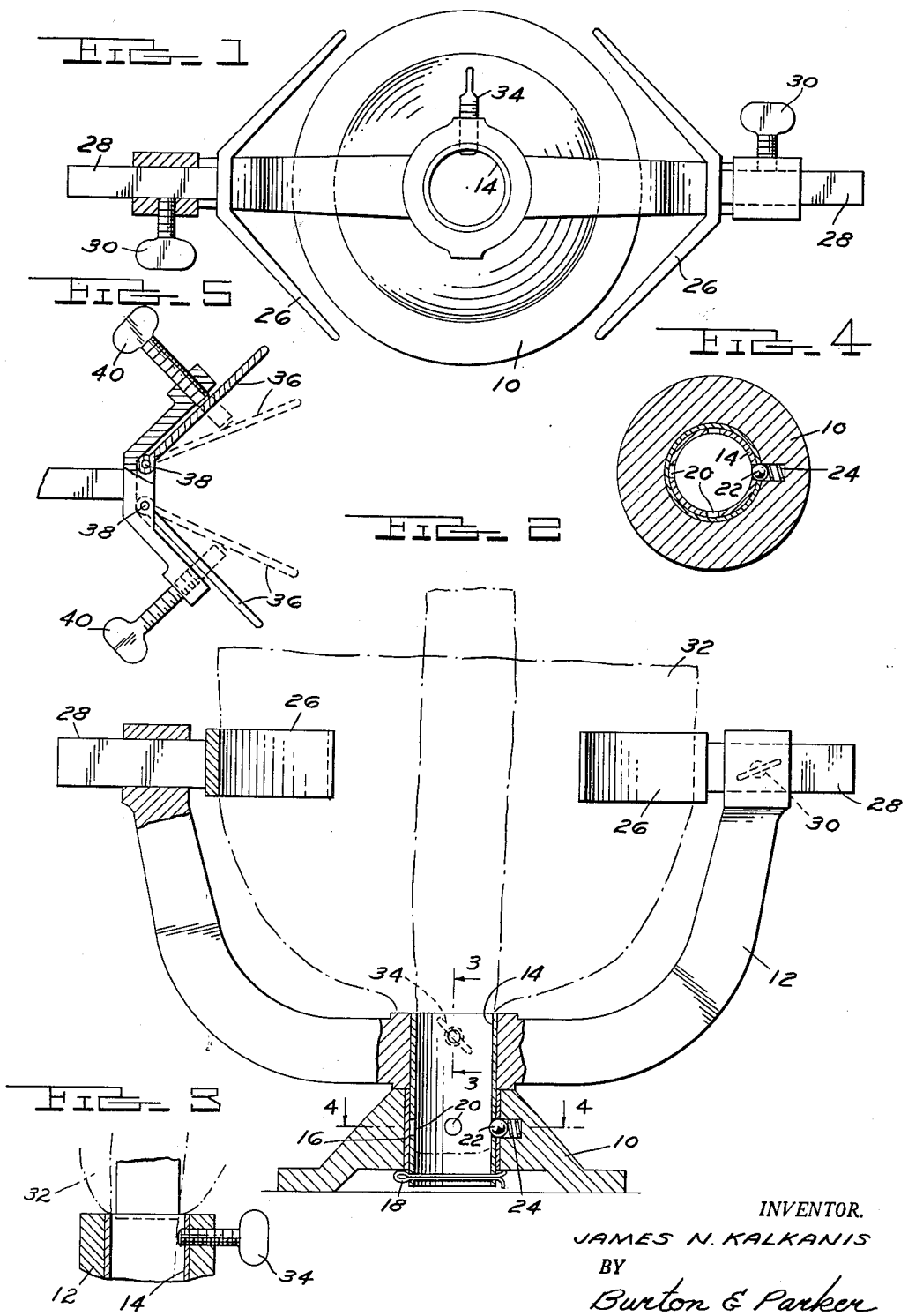
INVENTOR.
JAMES N. KALKANIS
BY
Burton & Parker
ATTORNEYS

United States Patent Office 2,736,355
Patented Feb. 28, 1956

2,736,355

HAM HOLDER FOR SLICING HAM

James N. Kalkanis, Detroit, Mich.

Application August 24, 1954, Serial No. 451,864

3 Claims. (Cl. 146—218)

This invention relates to an improved holding device for hams or the like whereby the meat may be held properly positioned for slicing.

The structure of this invention represents an improvement upon the structure shown in my Patent No. 1,823,608 issued September 15, 1931.

An object of the present invention is the provision of a holding device of the character specified which is capable of supporting a ham or other generally similar object for slicing and which holds the object to be sliced securely and rigidly against displacement and permits of it adjustment as the slicing operation continues.

Another object is the provision of a device as hereinabove set forth which includes a U-shaped member adapted to receive between the arms of the U a ham or other piece of meat for slicing and the base of which U-shaped member is provided with an opening adapted to receive the end of the bone of a ham or other similar object to assist in positioning the object.

A meritorious feature of the invention is the provision in a device of the character described of cooperating adjustable gripping parts carried by the arms of the U-shaped member, which parts are shiftable toward and away from each other interiorly of the U. Such parts also include swingably supported ham engaging means adapted to cooperate in engaging and holding a ham securely for slicing.

The entire device may be disposed within a pan or other receptacle so that any drippings from the ham would be collected thereby, and the opening in the base of the U adapted to receive an end of the ham bone likewise communicates through the base of the device with the interior of such pan.

Other objects, advantages, and meritorious features will more fully appear from the following description, drawing, and claims, wherein:

Fig. 1 is a plan of an embodiment of my invention;

Fig. 2 is an elevation of the structure shown in Fig. 1 partly broken away to show the pivotal mounting of the U-shaped member;

Fig. 3 is a vertical sectional view taken on the line 3—3 of Fig. 2;

Fig. 4 is a horizontal sectional view taken on the line 4—4 of Fig. 2; and

Fig. 5 is a plan of a fragment of one of the ham engaging devices representing a modification and partly broken away to show the construction thereof.

The device of this invention is shown as embodying a base member 10 upon which is journaled a U-shaped element 12. The bottom of the U-shaped element is shown as provided with an opening in the form of a tubular extension 14. This tube 14 extends entirely through the bottom of the U-shaped member 12. It opens interiorly thereof as shown in Figs. 1 and 2 and it also projects below the bottom thereof. It is secured to the bottom of the U to form an integral part thereof. The portion which depends therebelow is journaled within a bushing 16 which bushing is disposed axially within the base 10. The bushing forms a bearing within which the tubular extension 14 may be rotated.

The U-shaped member, while rotatably journaled upon the base as above set forth, is releasably supported thereupon. A cotter pin 18 is shown as extending through the lower end of the extension 14 below the base. Upon removal of the pin, the U-shaped member may be separated from the base for shipment, storage, cleaning, or the like. To hold the U-shaped member at adjusted positions of rotation relative to the base, the tubular extension 14 is provided with a series of circumferentially spaced openings 20, four being here shown. The base itself carries a ball 22 which is urged by a spring 24 to be received within the openings 20 to position the U-shaped member at different positions of rotation upon the base.

Each arm 12 carries a ham gripping or engaging element in the form of a yoke 26 having a shank 28. The shanks of these two yokes extend through passageways in the ends of the opposed arms of the U-shaped member 12. These yokes are shiftable toward and away from each other interiorly of the U. Each yoke is adapted to be locked at adjusted positions by a thumb screw 30. The yokes may therefore be moved against opposite sides of a ham or the like 32 as shown in dotted outline in Fig. 2. The end of the ham bone is shown in Fig. 2 as received within the tubular extension 14. A thumb screw 34 is shown in Figs. 2 and 3 as carried by the base of the U-shaped member and adjustable in and out of the tubular extension 14 to engage the ham bone disposed therein to assist in positioning the ham. It is apparent that if it were desired to slice a piece of meat other than a ham provided with a natural bone, such piece of meat might be provided with a skewer or other pin properly disposed to be received within the tubular extension 14 to serve the purpose of the ham bone in positioning the piece of meat between the arms of the U.

In Fig. 5 a modification of the yoke elements 26 shown in Figs. 1 and 2 is illustrated. If it is desired that yoke elements be provided which will engage pieces of meat of less dimension than a ham, each of the two forks of the yoke 26 might be provided with a swingable plate 36. Each such plate is shown in Fig. 5 as pivotally supported at 38. A thumb screw 40 is shown as threaded through each fork of the yoke and adapted to engage the plate to urge it inwardly so that some gripping action might be obtained upon a piece of meat disposed between the arms of the U even though such were not of the dimension of a ham.

What I claim is:

1. A ham holder comprising, in combination, a base, an upright U-shaped member having opposed arms and provided with a tubular bottom extension opening interiorly of the U-shaped member and having a portion projecting below the bottom of the U-shaped member, said projecting portion of the tubular extension journaled within the base supporting the U-shaped member for rotation about a vertical axis relative to the base, means carried by the base releasably engaging the U-shaped member to lock the same at adjusted positions of rotation relative to the base, the opposed arms of the U-shaped member provided with opposed cooperating ham-engaging parts movable toward and away from each other interiorly of the U-shaped member, means carried by the arms engageable with said parts for locking the parts in adjusted position relative to each other, said tubular extension adapted to receive the bone end of a ham supported between the opposed arms of the U-shaped member and held supported by said parts.

2. A ham holder as defined in claim 1 characterized in that each of said ham-engaging parts is formed generally in the shape of a U, said U-shaped parts opening toward each other, and a plate is pivotally supported within each of said U-shaped parts overlying one of the arms of the part, and said U-shaped part is provided with adjustment mechanism engaging said plate and operable to move the plate toward and away from the arm of the U-shaped part overlaid by the plate.

3. A ham holder as defined in claim 1 characterized in that the U-shaped member carries a ham-engaging device which projects through the wall of the tubular extension into the interior thereof and is adjustable to engage a ham bone disposed within said tubular extension.

References Cited in the file of this patent
UNITED STATES PATENTS

| | | |
|---|---|---|
| 1,199,500 | Salchli | Sept. 26, 1916 |
| 1,823,608 | Kalkanis | Sept. 15, 1931 |